A. TEBBIT.
HOMOGENIZING MACHINE.
APPLICATION FILED MAR. 27, 1911.
1,000,641.
Patented Aug. 15, 1911.
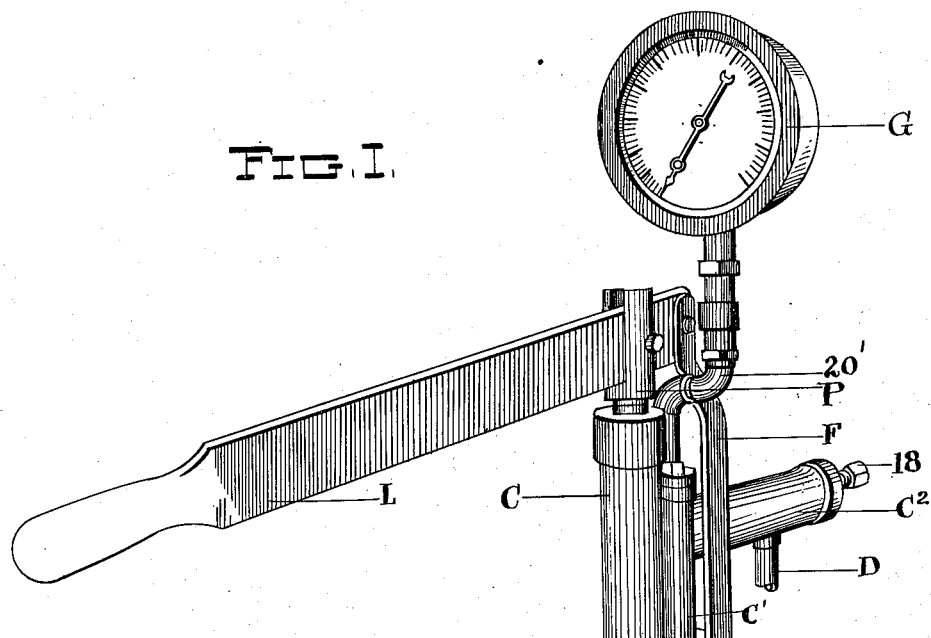
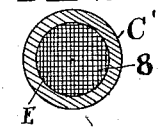
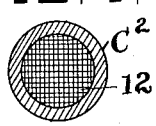
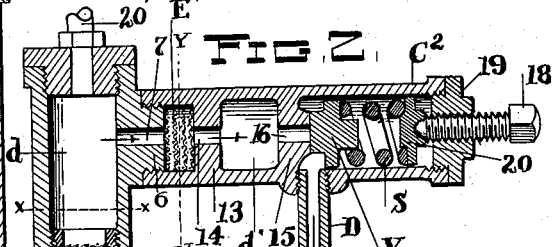
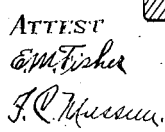
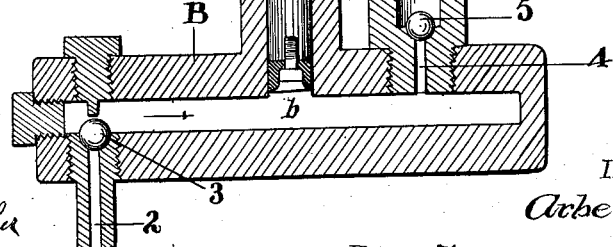

UNITED STATES PATENT OFFICE.

ARBER TEBBIT, OF MEDINA, OHIO.

HOMOGENIZING-MACHINE.

1,000,641.  Specification of Letters Patent.  Patented Aug. 15, 1911.

Application filed March 27, 1911. Serial No. 617,024.

*To all whom it may concern:*

Be it known that I, ARBER TEBBIT, citizen of the United States, residing at Medina, in the county of Medina and State of Ohio, have invented certain new and useful Improvements in Homogenizing - Machines, of which the following is a specification.

My invention relates to what have become known to the trade as homogenizing machines, designed to be used more especially by ice cream manufacturers but not limited to their use, and both the theory of the machine and the fact or effect of its operation is to break up the cream globules or sacks in milk and incorporate the same with the body of the milk in such effective manner that such globules or their contents cannot thereafter be recovered or separated and that the milk and the cream are rendered homogeneous, or, in other words, are homogenized. This reduces the milk to the most desired condition possible for very many uses including the manufacture of ice cream. The principle or method of treatment by which these results are accomplished in milk with its natural cream content, or in cream as such, is adapted also to homogenize skimmed milk and fresh unsalted butter, the butter being contributed in a melted state and affording the desired butter fat for the manufacture of an excellent quality of ice cream. By my system of treatment I can as effectually introduce the butter into the milk and make it a part thereof as if it were present as an original cream content, such as exists in fresh milk. In this process the cream globules present in greater or less quantities in fresh milk or cream as it may be ready to go to the churn, are disintegrated or disrupted and their contents so perfectly diffused with the body of the milk that they cannot be precipitated or recovered by any means at present known, so far as I am aware. This is accomplished under a high pressure which fixes the admixture of the elements and makes the new combination permanent.

Now referring to the accompanying drawings, Figure 1 is a perspective view of my new and original homogenizing machine, and Fig. 2 is a vertical sectional elevation thereof. Figs. 3 and 4 are cross sections on lines x—x, and y—y, Figs. 1 and 2.

In the drawings B represents a solid steel base having a pump cylinder C integral therewith in this instance and an inlet passage b through its center open to said cylinder and to the mixing cylinder or stand C' through which the milk is forced by the pump and in which the first step in the process occurs by forcing the milk through the disrupting and commingling medium E in cylinder C'. This medium may be of any suitable kind or construction but an arrangement of finely woven wires as shown serves the purposes, the said perforations being angular and not round in cross section, such as square holes in disks would afford and which may be employed. The pump is shown as having a plunger piston P adapted to be operated by hand lever L in this instance but it may be operated by power, and fulcrum posts F are shown at the rear, Fig. 1 in such close relation to the top of said piston that a great leverage is afforded though with a comparatively short stroke. The said base B has an inlet passage 2 in its bottom opening into passage b and a ball valve 3 or its equivalent seats over said inlet. The cylinder or stand C' has a stem screwed into base B and a passage 4 through the same with a ball valve 5 seating thereon. Any suitable check valve may be used for this purpose. Another mixing cylinder, $C^2$, is mounted on cylinder C' at right angles thereto near its top and projects rearwardly therefrom as compared with lever L. As here shown the tube C' has an externally threaded boss 6 at its top and rear and the tube $C^2$ is removably fixed on said boss. Said cylinder $C^2$ has two diaphragms, 13 and 15 respectively, with small passages through the same and a cream globule disrupting and mixing medium E' is inserted between diaphragm 13 and boss 6, and which may be either fine mesh wire as in the case of devices E or other sufficient means, the essential function of the device being to break up the cream globules, specks or floats and mix them with the milk. The diaphragm 13 is provided with a passage 14 centrally through the same and diaphragm 15 has a discharge passage 16, and a mixing effect is obtained in both said passages.

The breaking up device E' is practically a repetition of the device E and is intended to intercept and disrupt such cream globules or floats as have escaped unbroken through E. Then by forcing the milk through the relatively narrow passage 14 I force admixture of the elements which would not otherwise occur. All this is done under or against a back pressure from spring S and back-check valve V located in cylinder C² outside the outer diaphragm 15. Both the face of diaphragm 15 and the face of valve V seated thereon are shown as perfectly flat and smooth so as to perfectly seal the passage 16 when the parts are at rest and an adjusting screw 18 bears against spring S through cap 19 and disk 20 so as to place said spring under any desired tension up to say 5,000 pounds per square inch.

A gage G is shown adapted to record the pressure induced through or by spring S up to the maximum of 5,000, and said gage is supported by a pipe 20' from the top of cylinder C', as shown herein, but it might be arranged at some other point in the milk area in cylinders C' and C², it being understood that a uniform pressure prevails within the machine between valve 5 and the exhaust valve V after the pump begins to do its work.

I am of course aware that others have sought to accomplish some of the results or effects attained by my machine, but their devices stop short of the ulterior result I have in view of combining all the elements or constituents of the milk in such way that the converted product will be homogeneous and permanent and there will be no possible rising or recovery of cream for churning or any other purpose. Milk treated by my machine never shows any cream at all, and the cream as such entirely loses its original characteristics and becomes a fixed component part of the milk. This difference results in greater or less measure from the very high back pressure under which I operate and which helps to squeeze the cream globules to a breaking state while they are otherwise put under strain in passing through holes smaller than they are and which conduce to disruption.

What I claim is:

1. A machine for treating milk comprising a suitable base and a pump and a mixing stand on said base and operatively connected through the same, a device in said stand having finely divided openings for disintegrating cream globules forced through the same, a chamber next to the said stand having a globule disrupting and mixing device and a pressure check controlling the outlet from the machine.

2. A machine having a pump and successive mixing chambers provided each with means to disintegrate cream globules forced through the same by said pump, and a pressure fixing device at the end of the second of said chambers adapted to raise the pressure to a homogenizing degree between the cream and the body of the milk.

3. A machine for treating milk comprising a base and a pump and a mixing chamber mounted side by side thereon and open to each other through said base, a device in said chamber adapted to disrupt cream globules and a second mixing chamber having a mixing device in its inner end constructed to deliver the milk in a single fine stream and a pressure regulating device at its outer end.

4. A homogenizing machine for milk having a solid base with a passage through same for milk, a pump and a mixing cylinder side by side tapped into said passage, a second mixing cylinder open to the top portion of said first named cylinder having a relatively fine single outlet passage in its front end and a mixing device in advance of said outlet and provided with a single central outlet and a spring pressed valve closing said outlet.

5. In a milk or cream homogenizing machine, a device adapted to disrupt the cream globules constructed with angular holes of a size relatively smaller than said globules and means to force the globules through said holes.

6. A machine as described having a solid metallic base with a passage through the same, a hand pump and a mixing cylinder open to said passage and check valves in said passage to said cylinder, a second cylinder on the rear of said first named cylinder and a cream disrupting device in each cylinder and a series of relatively reduced openings 7, 14 and 16 successively in the cream passage through said cylinder, whereby the cream is crowded into permanent union with the milk.

In testimony whereof I affix my signature in presence of two witnesses.

ARBER TEBBIT.

Witnesses:
 E. M. FISHER,
 F. C. MUSSUN.